(12) United States Patent
D'Englere

(10) Patent No.: US 8,527,377 B2
(45) Date of Patent: Sep. 3, 2013

(54) POINT CODE TO BILLING ID

(75) Inventor: David D'Englere, Concord, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 828 days.

(21) Appl. No.: 12/334,102

(22) Filed: Dec. 12, 2008

(65) Prior Publication Data

US 2010/0153246 A1    Jun. 17, 2010

(51) Int. Cl.
*G07F 19/00* (2006.01)
*G06Q 40/00* (2012.01)

(52) U.S. Cl.
USPC .............................................. 705/34; 705/40

(58) Field of Classification Search
None
See application file for complete search history.

(56) References Cited

U.S. PATENT DOCUMENTS

| | | | | |
|---|---|---|---|---|
| 5,825,863 A * | 10/1998 | Walker | | 379/114.2 |
| 5,953,398 A * | 9/1999 | Hill | | 379/121.04 |
| 6,026,291 A * | 2/2000 | Carlsson et al. | | 455/406 |
| 6,256,504 B1 * | 7/2001 | Tell et al. | | 455/456.2 |
| 6,404,869 B1 * | 6/2002 | Henderson et al. | | 379/144.01 |
| 6,516,190 B1 * | 2/2003 | Linkola | | 455/408 |
| 6,819,932 B2 * | 11/2004 | Allison et al. | | 455/466 |
| 6,975,708 B1 * | 12/2005 | Scherer | | 379/88.22 |
| 7,146,191 B2 * | 12/2006 | Kerner et al. | | 455/558 |
| 7,260,192 B2 * | 8/2007 | Nolting et al. | | 379/114.01 |
| 7,773,735 B2 * | 8/2010 | Rudolph | | 379/114.2 |
| 2003/0091020 A1 * | 5/2003 | Bantukul et al. | | 370/349 |
| 2003/0115138 A1 * | 6/2003 | Brown et al. | | 705/40 |
| 2004/0198355 A1 * | 10/2004 | Kim et al. | | 455/435.1 |
| 2005/0086138 A1 * | 4/2005 | Prange | | 705/34 |
| 2006/0116105 A1 * | 6/2006 | Frankel et al. | | 455/406 |
| 2006/0206422 A1 * | 9/2006 | Mashinsky | | 705/40 |
| 2006/0206941 A1 * | 9/2006 | Collins | | 726/25 |
| 2006/0270386 A1 * | 11/2006 | Yu et al. | | 455/406 |
| 2007/0123229 A1 * | 5/2007 | Pousti | | 455/414.1 |
| 2008/0027839 A1 * | 1/2008 | O'Regan et al. | | 705/34 |
| 2008/0102864 A1 * | 5/2008 | Donoghue | | 455/466 |
| 2009/0061872 A1 * | 3/2009 | Hicks | | 455/436 |
| 2010/0041365 A1 * | 2/2010 | Lott et al. | | 455/406 |
| 2010/0056102 A1 * | 3/2010 | Chan et al. | | 455/406 |
| 2010/0114742 A1 * | 5/2010 | Yan et al. | | 705/34 |
| 2011/0137762 A1 * | 6/2011 | Pepe et al. | | 705/30 |

* cited by examiner

*Primary Examiner* — Mussa A Shaawat

(57) ABSTRACT

A method includes maintaining a repository of location identifiers and billing identifiers, wherein each of a plurality of network devices is associated with a location identifier in the repository, and each location identifier is further associated with at least one billing identifier. The method further includes receiving a communications message; determining a location identifier associated with the communications message; selectively retrieving a billing identifier from the repository based at least in part on the location identifier; and determining a billing rate based at least in part on the billing identifier.

26 Claims, 6 Drawing Sheets eCommerce Tables

Rate Tables

POINT CODE TO BILLING ID

BACKGROUND

A billing identifier may be determined for a communications message, such as a Short Message Service (SMS) message, based on a plurality of criteria. The billing identifier may be used to determine rate information including a charge rate and a measurement unit, from which a fee may be determined. The billing identifier may further be based upon a location identifier (e.g., Point Code) associated with a physical location or network location at which the communications message may originate or terminate. Thus, varied fees may be charged for communications messages based at least in part on location. Such varying fees may allow for billing of location dependent (e.g., international) rates for communications messages. Once a fee for a communications message is determined, the fee may then be debited from a pre-paid account associated with a subscriber.

DETAILED DESCRIPTION

Figure 1A:
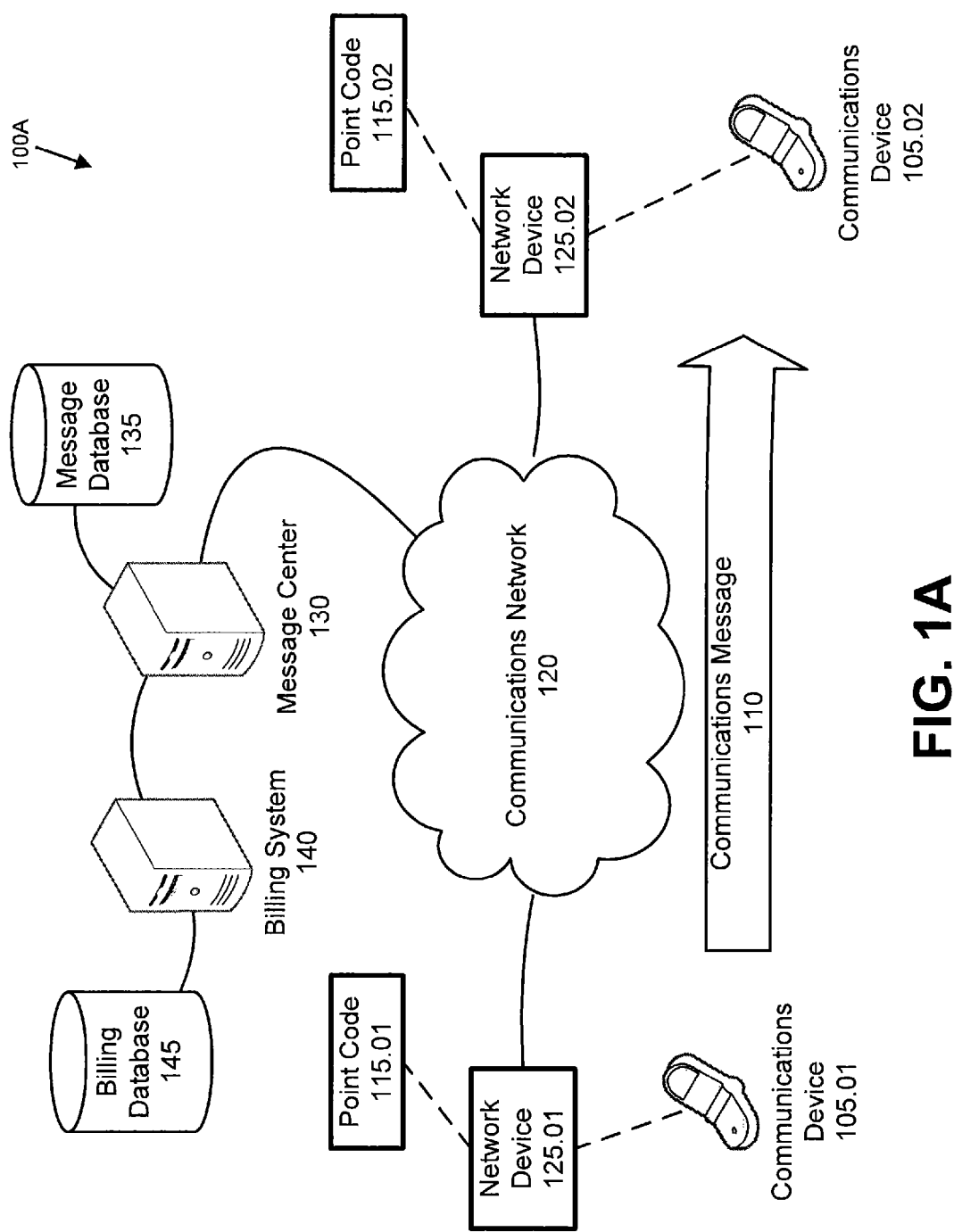
FIG. 1A illustrates an exemplary communications system for the billing of communications messages based at least in part on Point Code.

FIG. 1A illustrates an exemplary communications system (system) 100A for the billing of communications messages 110 based at least in part on Point Code 115. System 100A may take many different forms and include multiple and/or alternate components and facilities. While an exemplary system 100A is shown in FIG. 1A, the exemplary components illustrated in the figure are not intended to be limiting. Indeed, additional or alternative components and/or implementations may be used.

SMS is a messaging protocol that typically is used for the sending and receiving of Short Message Service messages to and from devices, including, for example, communications devices 105. An SMS message typically may contain up to 160 7-bit characters (or fewer characters in a larger bit encoding), and may include textual and binary data. Longer messages may be sent through the concatenation of multiple SMS messages. Communications messages 110 may include, for example, SMS messages. Communications messages 110 may further include SS7 signaling messages, voice messages, multimedia messages, and the like.

A wired communications device 105 may be accessed by a directory number, and may be associated with a fixed geographic location and served by a single wired switch. In a wireless network, a wireless communications device 105 may be associated with a directory number, but also may be associated with multiple geographic locations and may be served by any one of a number of wireless nodes, depending on the specific geographic location of the associated wireless communications device 105 at the time a communications message 110 is sent or received. This portability of a wireless directory number or wireless communications device 105 is often referred to as "roaming."

A Point Code 115 is a unique code which may be used to identify a network device or node, including, but not limited to an end office signaling point in a Public Switched Telephone Networks (PSTN) network, a Mobile Switching Center (MSC) in a cellular telephone network, and a Plain Old Telephone System (POTS) telephone. The Point Code 115 may be a network node address, and may typically be represented by a numeric code of a fixed length, for example as a 24 bit number in 8.8.8 format (e.g., '235.14.200'), although different lengths and representations are common.

A location identifier is an identifier that represents a physical, geographic, or network location. The Point Code 115 may be a location identifier, and identify or represent a geographic location or a network location on a communications network 120. For example, for a wired communications device 105, a Point Code 115 may represent a geographic location of the wired device such as a POTS telephone, while for a wireless communications device 105, Point Code 115 may represent a network location of a network device 125 to which the wireless communications device 105 is currently connected.

A communications message 110 may include a message and may also include at least one Point Code 115. In some examples, a communications message 110 may include both an Origination Point Code (OPC) and a Destination Point Code (DPC), while in other examples the communications message 110 may contain only an OPC or only a DPC. In still further examples, the communications message 110 may contain an identifier, such as a directory number, from which the network may determine a Point Code 115.

For example, a PSTN network using Signaling System 7 (SS7) signaling may uniquely address Signaling Point network devices by Point Code 115. A subscriber may dial a string of digits, where the digits together form a directory number indicating a destination device for the call. The dialed directory number may form an identifier known as a Global Title, and the Global Title may be translated into a Point Code 115 by a Signal Transfer Point (STP), through a process known as Global Title Translation (GTT). Thus, the directory number of the call may be translated into an address of a specific network node, such as a fixed-location wired communications device 105.

In other examples, locations of individual communications devices 105 may not be fixed, although network devices 125 to which the communications devices 105 connect may remain relatively fixed in location. The physical or network locations of the network devices 125 may additionally be known, and the network devices 125 may be assigned individual Point Codes 115. Additionally, the Point Code 115 of the network device 125 to which a communications device 105 is attached may be included in a communications message 110 sent from the communications device 105. Thus, a communications message 110 originating from the communications device 105 may be associated with the physical or network location indicated by the Point Code 115 assigned to the network device 125 to which the wireless communications device 105 is currently connected. The communications message 110 may include a directory number from which a destination Point Code 115 may be determined (such as through Global Title Translation), or may include a destination Point Code 115 directly.

Through use of a system such as exemplary systems 100A and 100B, a Point Code 115 included in or determined from a communications message 110 may be translated into a billing rate to use in order to bill a subscriber account an appropriate amount for the communications message 110.

Various factors may be taken into account in the translation of a Point Code 115 into a billing rate. A billing identifier is an identifier that may be associated with or otherwise used to indicate a location identifier such as a Point Code 115. The billing identifier, alone or in combination with other identifiers, may be used by a system in determining a billing rate that varies based on location. In addition, the determination of a billing rate may take into account at least one of Class of Service (including, but not limited to pre-pay subscriber service where payment is made prior to use, post-pay subscriber service where payment is made after use, etc.), physical locale such as country (such as, Canada, New Zealand, etc.), and direction of the message (e.g., mobile originating and mobile terminating messages). Moreover, the systems 100A and 100B may also have the ability to support multiple different rate structures, to adjust rates as required, and to block users from using a specific communications protocol (e.g., SMS, MMS, etc.) in designated jurisdictions (e.g., countries).

As illustrated in FIG. 1A, system 100A includes communications devices 105. A communications device 105 (such as communications device 105.01, communications device 105.02) or other communications device (e.g., POTS telephone, Voice over Internet Protocol (VOIP) telephone, mobile telephone, "softphone," pager, computer, Set Top Box (STB), etc.) is used by a subscriber to send and receive communications (including, but not limited to voice, text, binary data, and so on) on a communications network 120 (such as PSTN, VOIP, cellular telephone, etc.). Likewise, a communications network 120 may provide communications services, including voice calling, packet-switched network services (including, but not limited to Internet access and/or VOIP communication services), as well as communications messaging (e.g., SMS messaging, Premium SMS messaging services, etc.), to at least one communications device 105 (e.g., communications device 105.01, communications device 105.02).

In the illustration, an exemplary communications message 110 is shown. A communications message 110 may be sent from an origination communications device 105.01 to a destination communications device 105.02, via communications network 120. The communications message 110 may be of various types, for example, including, but not limited to an SMS message, an SS7 signaling message, a voice telephone message, or a VOIP internet protocol packet.

A network device 125 (such as an end office signaling point in a PSTN network, a Mobile Switching Center in a mobile telephone network, and the like), is a device through which a communications device 105 may access communications services of a communications network 120. In FIG. 1A, two network devices 125 are shown. Although a communications network 120 typically would be connected to more than two network devices 125, examples with one or two network devices 125 are possible.

Each of the plurality of network devices 125 on communications network 120 (for example, network device 125.01, network device 125.02) may be associated with a Point Code 115 (e.g., Point Code 115.01, Point Code 115.02). In FIG. 1A, network device 125.01 is associated with Point Code 115.01, and network device 125.02 is associated with Point Code 115.02. As discussed above, a Point Code 115 is a unique identifier that may be used to uniquely identify a network device 125. Each Point Code 115 may be associated with a physical location or a network location.

In some examples, a database of Point Codes 115 to physical locations or network locations may be included or otherwise made available to the communications network 120, for example indexed by Point Code 115 and accessible by message center 130. When such a database may be queried by a Point Code 115 associated with a network device 125, a physical location or network location for that network device 125 may be retrieved. Therefore, through the use of an associated Point Code 115, the physical location or network location of a network device 125 may be determined.

A message center 130 generally provides store-and-forward functionality for communications messages 110 (such as SMS and Premium SMS messages). The message center 130 may generally include one or more specialized computers to transmit communications messages 110 to a plurality of communications devices 105. Message center 130 may be in selective communication with at least one network device 125, for the transmission of communications messages 110 (e.g., SMS messages, SS7 signaling messages, voice telephone messages, VOIP internet protocol packets, etc.) to a communications device 105.

In many examples, the message center 130 is a computing device, including a processor, and storage. A processor (e.g., a microprocessor) receives instructions from storage, e.g., from a computer-readable medium such as a memory, and executes these instructions, thereby performing one or more processes, including one or more of the processes described herein. Such instructions may be stored and transmitted using a variety of known computer-readable media.

In general, computing devices such as message center 130 may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of well known computing devices, including, without limitation, a computer workstation, a desktop, notebook, laptop, or handheld computer, or some other known computing device.

Computing devices generally each include instructions executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, a message center 130 may be implemented as computer-readable instructions (e.g., software) on one or more computing devices (e.g., servers, personal computers, etc.), stored on computer readable media associated therewith (e.g., disks, memories, etc.).

In any event, each message center 130 is generally associated with one or more network devices 125, and each message center 130 generally simultaneously (or nearly simultaneously) handles communications messaging for a plurality of communications devices 105.

In addition to handling communications messages 110, a message center 130 may selectively bill for the communications message 110, based at least in part on a Point Code 115 associated with an origination or destination network device 125. The message center 130 may bill a subscriber associated with the origination of the communications message 110, bill a subscriber associated with the destination of the communications message 110, bill both subscribers, or bill neither subscriber. The message center 130 may be connected to one or more billing systems 140. When the message center 130 receives a communications message 110 (such as from a communications device 105), the message center 130 may selectively bill the message originator for the communications message 110 based on criteria including, but not limited to the message data, the account information of a subscriber, a Point Code 115 associated with the origination network device 125 (for example, Point Code 115.01 associated with network device 125.01), and a Point Code 115 associated with a destination network device 125 (e.g., Point Code 115.02 associated with network device 125.02). The message center 130 may access account information of the subscriber to bill through billing system 140, for example, based on a subscriber identifier (e.g., directory number for the originating communications device 105, information from a call record associated with the message, etc.), which may be included in or associated with the communications message 110.

A message database 135 may be included within message center 130, or may be part of a separate computing system. Message database 135 may include database tables allowing for translation of Point Codes 115 into identifiers (including, but not limited to Service Type/Billing Identifier 210, Band Label 230, etc. discussed below) for use with billing system 140.

Message database 135 may include one or more relational databases. Alternatively or additionally, message database 135 may include one or more object-oriented or hierarchical databases, or other mechanisms for storing and accessing data, including arrays, pointers, flat files, etc. As mentioned above, message database 135 may be included in a separate computing device from message center 130, or may be a software application executing on a same computing device as message center 130.

Data entries may be stored in message database 135, whereby data entries may be updated, deleted, added, accessed, etc. Individual data entries may be represented by one or more database records included in message database 135. Exemplary data relationships are described in more detail with regard to FIG. 2, and exemplary data tables are described in more detail with regard to FIGS. 3A and 3B.

Figure 2:
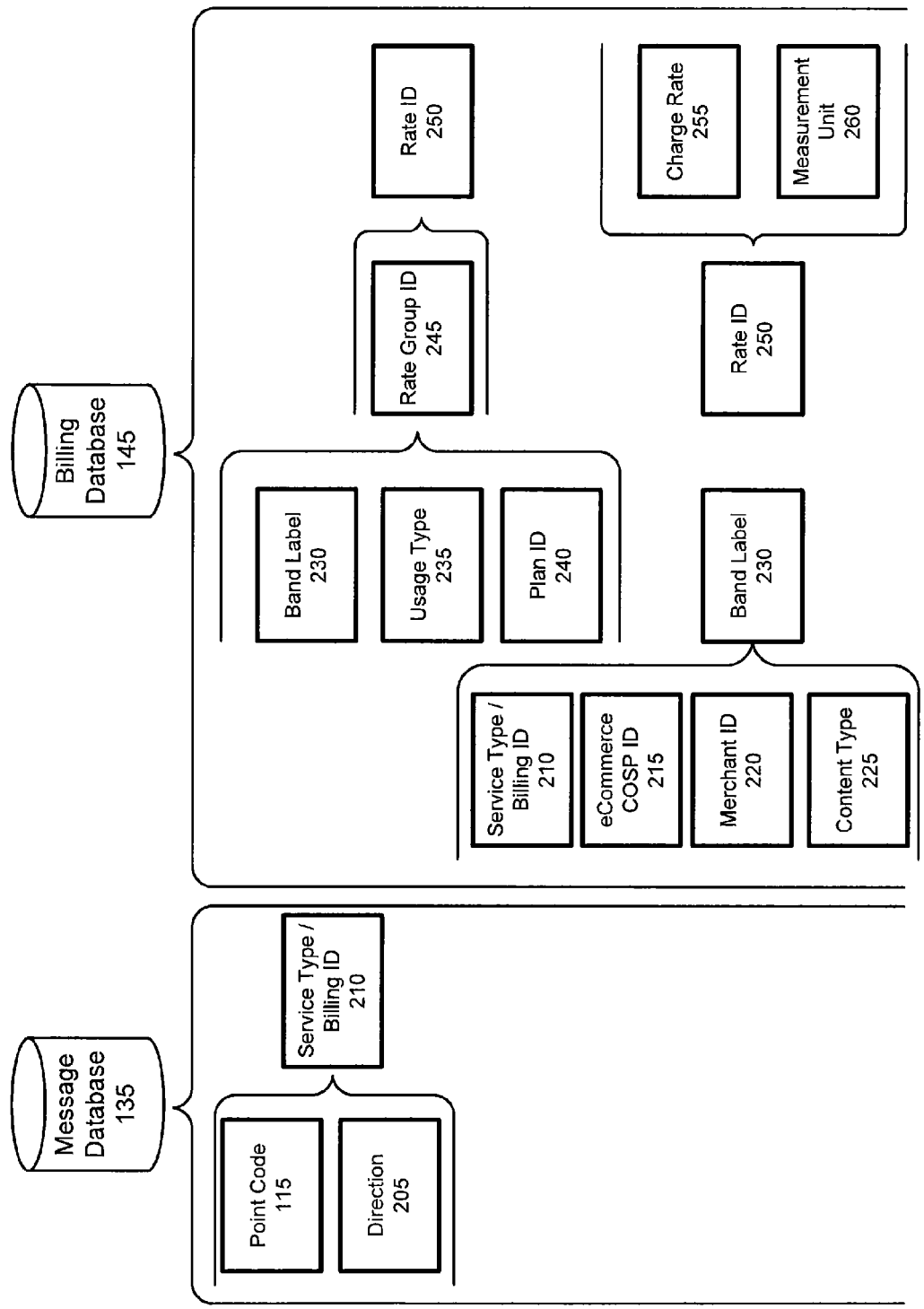
FIG. 2 illustrates an exemplary data relationship for a set of data elements that may be used to enable a database to perform a query of rate information.

A billing system 140 selectively provides billing information to a message center 130 for use in billing a subscriber account associated with a communications device 105. A subscriber account may be billed for the sending, receiving, and delivery of communications messages 110. Billing system 140 generally includes a processor and a memory, as well as a computer readable medium such as a disk or the like for storing data (including, but not limited to Point Codes 115, billing rates, subscriber information, database tables) to be provided to message center 130. A billing database 145 may be included within billing system 140, or may be part of a separate computing system. In any event, billing system 140 is generally configured to selectively retrieve information from billing database 145 in response to requests, such as for a billing rate. A billing rate may for example include a Charge Rate 255 and a Measurement Unit 260, which are discussed in more detail below. Additionally, billing system 140 may be configured to store billing information (merely by way of example, see the elements as illustrated by FIG. 2) to be retrieved later by a user for use in billing a subscriber for the sending, receiving, or delivery a communications message 110 in conformance with the stored billing information of the user.

Figure 1B:
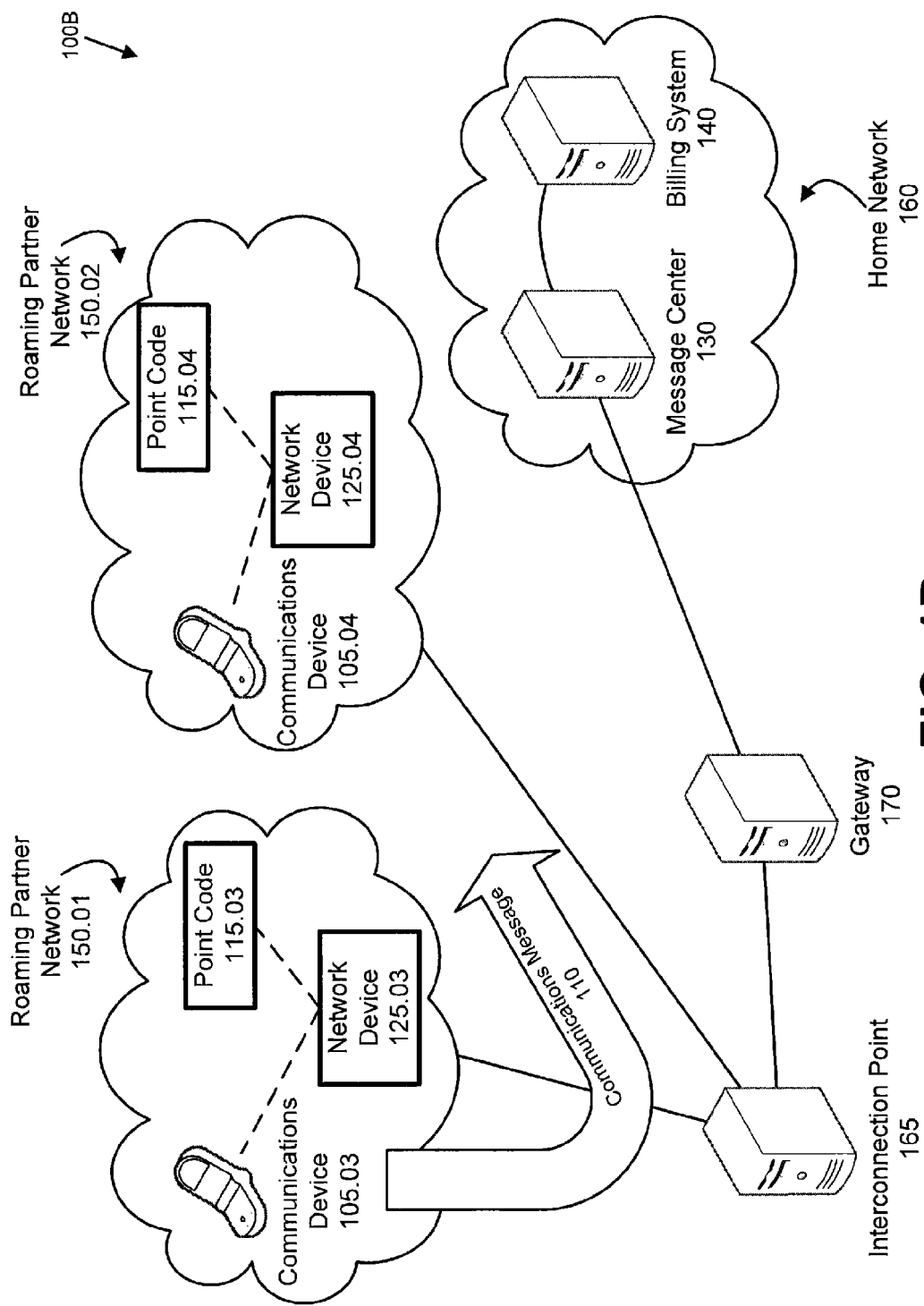
FIG. 1B illustrates an exemplary communications system for the billing of communications messages flowing between multiple networks.

FIG. 1B illustrates an exemplary communications system for the billing of communications messages flowing between multiple networks.

A home network 160 is a network in which a subscriber is registered. A roaming partner network 150 is a network that is not a home network 160 of the subscriber. Roaming may refer to the extending of connectivity service to a location that is different from the home location where a subscriber is registered. Networks may enter into roaming agreements with other networks, where a network may interact with and accept communications from a communications device 105 even though the communications device 105 is typically associated with a different network. Roaming agreements may be one way or reciprocal, and may be made with other networks directly, or through intermediaries, such as interconnection point 165.

Regional roaming may be where a subscriber moves from one region to another inside a network such as a national network. For example, a national network may be divided into regions, and a subscriber may move among regions to outside of a home region. National roaming may be where a subscriber moves from one service provider to another within a country. For example a subscriber may enter into a region of a state where a home provider does not provide service, and where the home provider has a roaming agreement with a second provider. International roaming may be where a subscriber moves to or from the network of a foreign service provider, such as an American subscriber traveling to Canada, Mexico or China. Moreover, roaming may be inter-standards, where a subscriber roams between networks of different technologies, for example roaming from one to another of a Code Division Multiple Access (CDMA) network, a Time Division Multiple Access (TDMA) network, a Frequency-Division Multiple Access (FDMA) network, a Global System for Mobile communications (GSM) network, or other network technology.

A subscriber using a communications device 105 may send a communications message 110 from a location within a home network 160 to another location within the same home network 160. In further examples, a subscriber using a communications device 105 may send a communications message 110 from a location within a roaming partner network 150 to a communications device 105 in the same roaming partner network 150, from a roaming partner network 150 to a communications device 105 in the home network 160, or from a roaming partner network 150 to a communications device 105 within a second roaming partner network 150.

Two roaming partner networks 150 are included in FIG. 1B, although more or fewer are possible. In some examples, roaming partner network 150 may be an international network, while in other examples roaming partner network 150 may be a domestic network.

A Prepay (retail/wholesale) subscriber may travel to a remote geographical locale such as a international location having an international roaming partner network 150 distinct from a home network 160 having a home locale usually associated with a communications device 105. The remote geographical locale may have an applicable roaming agreement with the home network 160, where it will interact with and accept communications from the communications device 105 even though the device is typically associated with the home network 160. The subscriber may create and send a communications message 110 (e.g., SMS message) from the international location. Messages such as SMS may be sent locally, back to the domestic network, or to another international location.

As illustrated in FIG. 1B, communications device 105.03 is connected to network device 125.03 and associated with Point Code 115.03. Point Code 115.03 may indicate that communications device 105.03 is currently located within a first roaming partner network 150.01. For example, Point Code 115.03 may be used to indicate that communications device 105.03 is connected to a network device 125.03 located within a Canadian mobile network, where the home network for communications device 105.03 is an American mobile network.

Similarly, Communications device 105.04 is connected to network device 125.04 and associated with Point Code 115.04. Point Code 115.04 may indicate that communications device 105.04 is currently located within a second roaming partner network 150.02. For example, Point Code 115.04 may indicate that communications device 105.04 is connected to network device 125.04 on a New Zealand communications network.

The at least one roaming partner network 150 may be connected to an interconnection point 165. An interconnection point 165 is a point where a plurality of networks may exchange packets under the administration of an entity that typically does not operate any of the plurality of networks. The interconnection point 165 may serve to route traffic and to act as a trusted party among the plurality of networks, such as home network 160 and the at least one roaming partner network 150. A network provider may enter into a roaming agreement with an interconnection point 165 to manage roaming services and to manage information for billing of its subscribers. For example, such an agreement may allow subscribers of a first network provider to access the network of a second network provider, and allow the first network provider to gain information necessary to bill the subscribers for services used while attached to the second network.

Interconnection point 165 may be further connected to gateway 170, and gateway 170 may in turn be connected to home network 160. Gateway 170 may be omitted in some examples, or in other examples may perform the same or similar functions to that of interconnection point 165. Gateway 170 may further provide features such as security monitoring and connection to networks including, but not limited to home network 160, PSTN networks, and VOIP networks.

Home network 160 may be a home locale for at least one communications device 105 (e.g., communications device 105.03, communications device 105.04, etc.). Although a communications device 105 may be connected to and operate while in a roaming partner network 150, home network 160 may still provide services and determine access permissions for services for the communications device 105.

As mentioned above, wired communications devices 105 are typically associated with a fixed geographic location and are served by a single wired switch. However, wireless communications devices 105 may be served by any one of a number of wireless devices depending on the specific geographic, physical, or network location of the associated wireless device at the time a communications message 110 is sent or received.

A wireless communications device 105 may be associated with an entry in a Home Location Register (HLR) corresponding to the home network 160 of the communications device 105. The HLR may include a central database containing details of each communications device 105 that is authorized to use the communications network 120 (such as home network 160). The HLR may provide authentication services, including determining access rights for the communications device 105, as well as identifying a subscriber and including subscriber data related to features and services.

Additionally, the HLR may also maintain a database including the current locations of communications devices 105 associated with the HLR. For example, the HLR may maintain a database of communications devices 105 and the Point Code 115 of the network device 125 to which each communications device 105 is connected, if any. Other devices on the network, such as network device 125, may keep a record of the communications devices 105 which are currently connected to them, and when a new communications device 105 is detected by a network device 125 as being connected, the network device 125 may send a message to the home HLR of the communications device 105 so the HLR may update its location information for the location of the communications device 105.

For example, a subscriber of a home network 160 may send a Mobile Originate communications message 110 using communications device 105.03 while the device is in roaming partner network 150.01, and where the communications message is addressed for delivery to communications device 105.04. The communications message 110 may be associated with Point Code 115.03 indicating the origination Point Code 115, and also with Point Code 115.04 indicating the destination Point Code 115.

The communications message 110 may be routed through interconnection point 165, through gateway 170, and into the home network 160. In some examples, communications message 110 may be sent over Signaling Transport Protocol (STP) links to get to the home network 160. The communications message 110 may arrive at message center 130, and the message center 130 may then selectively deliver the communications message 110 to the destination.

The message center 130 may perform a lookup of the subscriber directory number to determine whether the subscriber is a pre-paid or post-paid subscriber. If the subscriber is post-paid, then the subscriber may be billed later and the communications message 110 may be allowed. However, if the subscriber is pre-paid, then it may be desirable to perform billing at or near the time of the message, such as debiting the pre-paid subscriber account before delivering the communications message 110 in order to ensure payment.

If the subscriber is pre-paid, then the message center 130 may perform a lookup of the Point Code 115 or Point Codes 115 included in or determined from the communications message 110. If the Point Code 115 is listed in a database, such as message database 135, then the Point Code 115 may be mapped to a billing identifier. If the Point Code 115 is not listed, then a standard messaging rate may apply for the communications message 110. The billing identifier may be sent to billing system 140. The billing system 140 may receive the billing identifier and map it into a price point to debit from the account of the subscriber. If the subscriber account includes sufficient funds to cover the amount to bill, then the message center 130 may deliver the communications message 110 to communications device 105.04. If the subscriber account lacks sufficient funds, the communications device 105.04 may be informed of the deficiency.

As another example, a subscriber of a home network 160 may receive a Mobile Terminate communications message 110 sent from a communications device 105 connected to home network 160, where again the communications message 110 is addressed for delivery to communications device 105.04. In this example, the HLR for the home network 160 may send Point Code 115 information to the message center 130 informing the message center 130 where the communications device 105.04 is currently located. Message center 130 may then deliver the communications message 110 to communications device 105.04, and also inform the billing system 140 to debit the subscriber account while taking into account the location of communications device 105.04 in determining a billing rate.

Thus, a home network 160 may be able to determine a rate for communications message 110 sent from a communications device, such as communications device 105.03, while communications device 105.03 is located within a roaming partner network 150 or a home network 160, and/or while communications device 105.04 is located within a home network 160 or a roaming partner network 150.

In other examples, the communications message 110 may be routed to a Visiting Location Register (VLR) located within a roaming partner network 150 and not to the home network 160. The VLR may be used by the roaming partner network 150 to manage service requests from communications devices 105 that are away from their home locale. The VLR may communicate, such as using SS7 messages, to obtain information about roaming communications device 105.03 from the HLR of the home network 160 for the communications device 105.03, and to create a temporary record for the roaming communications device 105.03 in the VLR. Based on this temporary record, the VLR for roaming partner network 150.01 may be used to handle requests for communications device 105.03 instead of message center 130 while the device is roaming within partner network 150.01. For example a VLR may determine a Point Code 115, look up a billing identifier based on Point Code 115, and communicate with a billing system 140, such as the billing system 140 of the home network 160 or a billing system 140 in the roaming partner network 150, to determine a billing rate and/or to debit a subscriber account.

FIG. 2 illustrates an exemplary data relationship for a set of data elements that may be used to enable a database or databases to perform a query of a billing rate based at least in part on Point Code 115. The billing rate may be queried, for example, by a message center 130 or billing system 140, and the billing rate may be used to debit an appropriate amount for the sending, receiving, and/or delivery of communications messages 110, based at least in part on Point Code 115. Multiple billing rates may be determined for the same communications message 110, as different billing rates may be charged to a sender of a message and a receiver of the same message. While an exemplary data relationship is shown in FIG. 2, the exemplary relationship illustrated in the figure is not intended to be limiting. Indeed, data elements may be omitted, and additional or alternative data elements and/or implementations may be used in alternate examples.

As illustrated, at least part of a data relationship may be included within a message database 135, and part may be included within a billing database 145. However, the database division as illustrated is merely exemplary, and the entire data relationship may be included within message database 135, all within billing database 145, part in either database, some or all duplicated within a plurality of databases, divided among a plurality of databases in various configurations, etc.

As discussed above, a Point Code 115 may be used to identify or represent a location, such as a physical location or network location of a network device 125, a location of a communications device 105, etc. Moreover, a Point Code 115 may be determined based on a directory number or mobile device number, for example through Global Title Translation. A Point Code 115 or directory number representing the origination location of a communication message 110 may be included in the communications message 110, and a Point Code 115 or directory number representing the destination location of a message may also be included in the communications message 110. The communications message 110 may be routed to a message center 130, and the message center 130 may determine at least one billing rate for the communications message 110. For example, a billing rate of $0.10 per communications message 110 may be determined for a sender of the message, and a billing rate of $0.05 per communications message 110 may be determined for a receiver of the message.

Generally, a message center 130 may send debit requests to a billing system 140, where the debit requests may include at least one identifier. The identifiers may be used by the billing system 140 in determining an appropriate billing rate. The identifiers may be associated with the communications message 110 and may include, for example, a Merchant ID indicating a service provider or service reseller for the communications message 110, and/or a Content Type indicating a type of content of the communications message 110. The billing system 140 may perform table lookup using the provided identifiers and so determine the billing rate for a communications message 110, such as according to the specified Merchant ID and Content Type. For example, a billing rate of $0.10 per SMS communications message 110 may be determined for one service reseller, while a billing rate of $0.05 per SMS or MMS communications message 110 may be determined for a second service reseller.

To support billing rates that vary based on the physical location or network location of a communications device 105, message center 130 may further send a Point Code 115 identifier or an identifier based at least in part on Point Code 115 to the billing system 140. As illustrated in FIG. 2, a Service Type/Billing Identifier 210 may be used to indicate a particular Point Code 115. The Service Type/Billing Identifier 210 may be included in a debit request to a billing system 140, and may be used by the billing system 140 in order to determine a billing rate based on Point Code 115. For example, a billing rate of $0.10 per communications message 110 may be determined for a first Point Code 115, while a billing rate of $0.05 per communications message 110 may be determined for a second Point Code 115.

A billing rate may further vary based on whether the communications message 110 is being sent to or from a communications device 105. A Direction 205 may indicate whether a billing rate is to be determined for a Mobile Originate (MO) or a mobile terminate (MT) communications message 110, and in some examples, the Service Type/Billing Identifier 210 may further indicate the Direction 205 of the communications message 110. Indeed, a first Service Type/Billing Identifier 210 identifier indicating a MO communications message 110 may be assigned for a particular Point Code 115, and a second identifier indicating a MT communications message 110 may also be assigned for the same Point Code 115. Thus, a Service Type/Billing Identifier 210 identifier may be included in a debit request to a billing system in order to determine a billing rate based on Point Code 115 and message Direction 205 (i.e. whether the communications message 110 is being sent or received). For example, a billing rate of $0.45 per communications message 110 may be determined for a MO message in Point Code 1234, while a billing rate of $0.25 per communications message 110 may be determined for a MT message in the same Point Code 1234.

More than one billing rate may be determined for a single communications message 110, such as a first rate for a sender of a message, and a second rate for a receiver of a message. For example, a first communications device 105 in a first Point Code 115 may send a communications message to a second communications device 105 in a second Point Code 115. In this example, a first billing rate may be determined for the first communications device 105 using a MO Service Type/Billing Identifier 210 identifier for the first Point Code 115, and a second billing rate may be determined for the second communications device 105 using a MT Service Type/Billing Identifier 210 identifier for the second Point Code 115. Then, the first communications device 105 may be debited an appropriate amount based on the billing rate for sending a communications message 110 from its Point Code 115, and the second communications device 105 may be charged an appropriate amount based on the billing rate for receiving a communications message 110 within its Point Code 115.

As mentioned above, some of the database tables may be included within message database 135, while other tables may be included within billing database 145. Generally, in a system including multiple databases, a data field or set of values may be in common between databases to allow for an interrelationship between them. In some examples and as illustrated in FIG. 2, the common element is the Service Type/Billing Identifier 210 value. For example, a Service Type/Billing Identifier 210 value may be included in a debit request message sent from a message center 130 to a billing system 140, and therefore in such examples the Service Type/Billing Identifier 210 values may be required to match across both message and billing databases.

Identifiers in addition to Service Type/Billing Identifier 210, Point Code 115, and Direction 205 may additionally be used to influence or otherwise determine a billing rate or billing rates to charge for a communications message 110. For example, communications devices 105 may be associated with different billing plans, and the same message or message type may have a different cost in different billing plans. Some devices may be in pre-paid plans, while other devices may be in post-pay plans. These identifiers as well as other identifiers (including, but not limited to, time of day, day of week, number of messages sent, etc.) may be used in order to determine a billing rate for a communications message 110. These identifiers may be included in a debit request message sent from a message center 130 to a billing system 140. In other examples, the billing system 140 may use identifiers, such as the plan for a communications device 105 based on the directory number of the communications device 105 or a call record associated with the communications message 110. In any event, a billing system 140 may include various database tables, which may be queried based on identifiers in order to retrieve an appropriate billing rate. Some exemplary identifiers are discussed below.

An eCommerce Class of Service Profile Identifier (COSP ID) 215 may be used to define the permissions or features available for a particular class of service. For example, pre-pay subscribers, and post-pay subscribers are examples of classes of service profiles. A post-pay subscriber may accrue fees during a billing cycle, where the fees become due at the end of the billing cycle (e.g., monthly, quarterly, on a specific date, etc.). However, a pre-pay mobile phone subscriber typically pays for service before use (for example, through purchase of a pre-paid phone card), and may not be subject to future billing. To facilitate payment of charges from a pre-paid subscriber for services rendered, accrued charges may be debited from the subscriber's account (such as from the subscriber's pre-paid phone card) at or near the time of use of a service. The billing rate may vary, for example, based on whether the communications device 105 is associated with a pre-pay or post-pay COSP ID 215.

A Merchant ID 220 is an identifier identifying at least one merchant, service reseller, etc. The billing rate may vary based on Merchant ID 220, as different merchants may charge subscribers different amounts.

A Content Type 225 is an identifier that may indicate a type of content for which a rate is to be specified. For example an SMS message may be indicated by a first content type code, while an MMS message may be indicated by a second content type code. The billing rate may vary based on Content Type 225.

A Band Label 230 is an identifier that may be created, for example, based on some or all possible combinations of Service Type/Billing Identifier 210, COSP ID 215, Merchant ID 220, and Content Type 225 identifiers. In this way, some or all combinations of Service Type/Billing Identifier 210, COSP ID 215, Merchant ID 220, Content Type 225, and other criteria may map to a Band Label 230. In other examples, alternate or additional data elements may be used to create unique Band Label 230 identifiers. A Band Label 230 may be used, for example, in part to identify a Rate Group ID 245, which in turn may be used to identify a Rate ID 250 and thus an associated billing rate. In other examples, Band Label 230 may identify a Rate ID 250 or a billing rate directly, although the use of Rate Group ID 245 and/or Rate ID 250 may for example aid in the ease of updating rate information.

A Usage Type 235 is an identifier that may be used to indicate a type of communications service. For example, a Usage Type 235 may indicate the type of a communications message 110, such as voice communications, SMS communications, MMS communications, etc.

A Plan ID 240, or Tariff Plan ID 240, is an identifier for a set of tariffs that may be applied to the subscriber account when the subscriber makes use of communications services of various Usage Types 235 (e.g., voice communications calls, SMS text messaging, MMS messaging, etc.).

A Rate Group ID 245 is a value that may be used to determine a Rate ID 250. A Rate Group ID 245 may be defined for a given combination of Band Label 230, Usage Type 235, and Plan ID 240. In this way, various combinations of Band Label 230, Usage Type 235, and Plan ID 240 may map to a Rate Group ID 245. In some examples the Rate Group ID 245 may not be a unique value, and multiple combinations may map to the same Rate Group ID 245. In further examples, a subset of Band Label 230, Usage Type 235, and Plan ID 240 and/or other criteria may be used map to a Rate Group ID 245. Through the use of a Rate Group ID 245, a rate group may be defined, for example, for a particular type of communications message 110 in a particular type of tariff plan for a particular Point Code 115 and service reseller.

A Rate ID 250 is a value that may be used to determine a Charge Rate 255 and Measurement Unit 260. For example, a database table may be configured to allow for the lookup of Charge Rate 255 and Measurement Unit 260 values based on a Rate ID 250. For each unique Rate ID 250, a Charge Rate 255 and Measurement Unit 260 may be indicated. In some examples, a Rate ID 250, along with at least one other parameter may be used to indicate a specific rate (including, but not limited to Charge Rate 255 and Measurement Unit 260, etc.) that may be charged. In other examples, Charge Rate 255 and Measurement Unit 260 may be looked up directly, for example, based on Band Label 230, Rate Group ID 245, Point Code 115, or another identifier without any intermediary Rate ID 250.

A Charge Rate 255 may indicate an amount of money to charge (e.g., $0.10, $0.45), while a Measurement Unit 260 may indicate for what unit, item, or event to charge the Charge Rate 255 (e.g., per unit, per message, per minute, etc.) Using both Charge Rate 255 and Measurement Unit 260 together may allow for a fee amount to be calculated, where the fee amount may then be charged for a particular communications message 110 or other action. In some examples, only Charge Rate 255 or only Measurement Unit 260 may be specified by a Rate ID. In other examples, other billing rate information instead of or in addition to Charge Rate 255 and Measurement Unit 260 may be included in a Charge Rate 255, such as for example a billing rate multiplier.

Figure 3A:
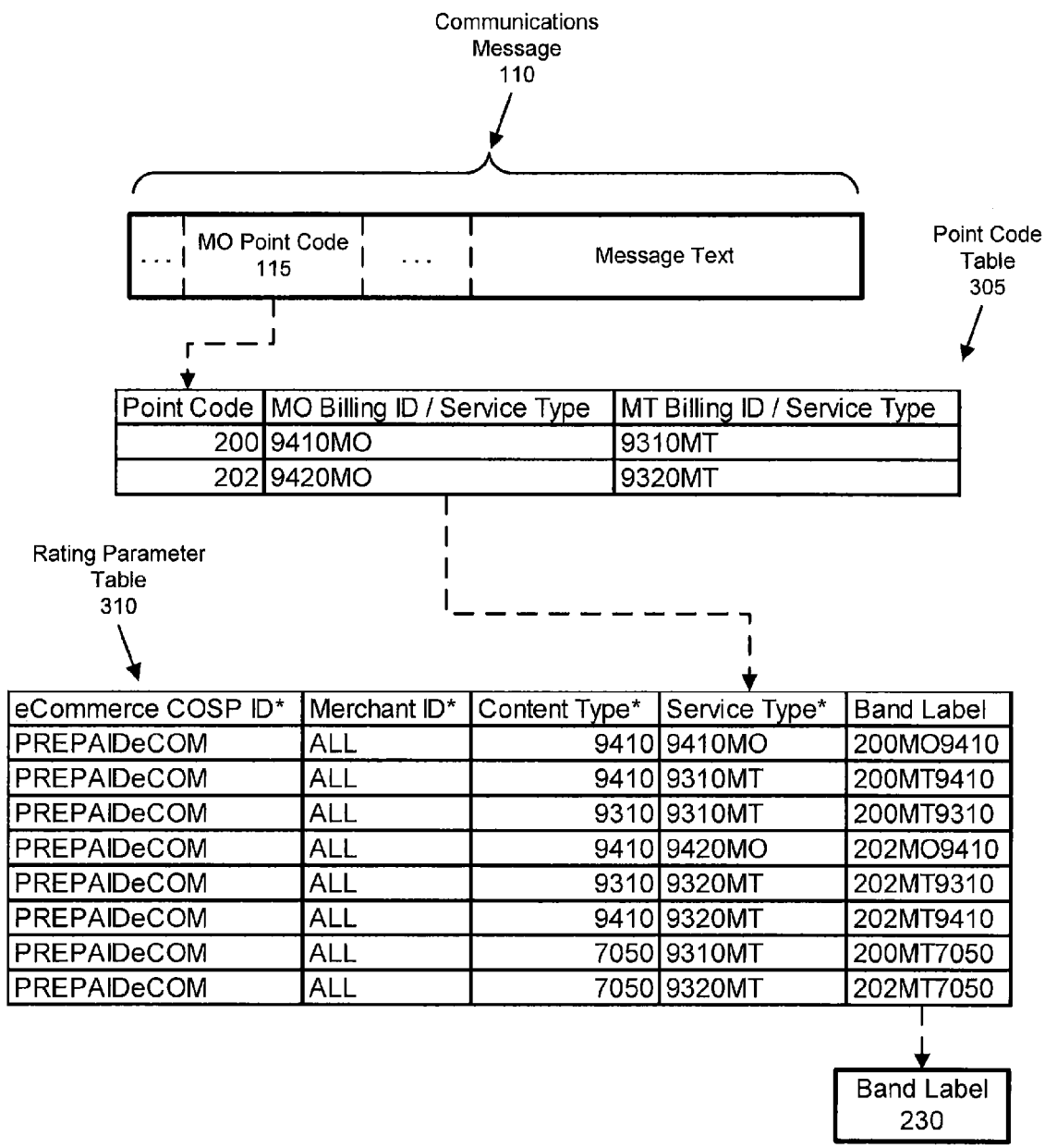
FIG. 3A illustrates an exemplary database structure that may be used to perform lookup of billing rates for communications messages.
Figure 3B:
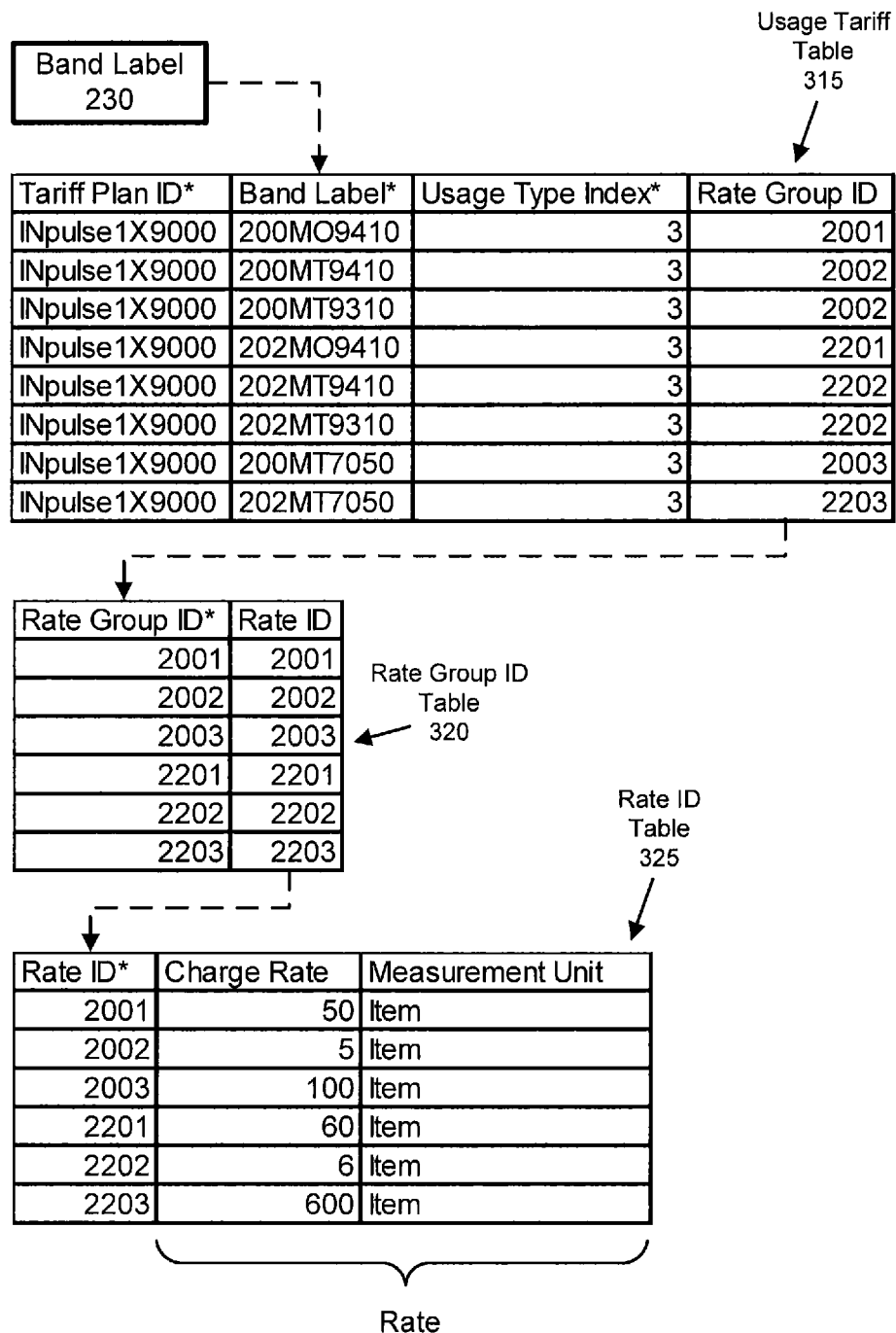
FIG. 3B illustrates an exemplary database structure that may be used to perform lookup of billing rates for communications messages.

FIGS. 3A and 3B illustrate an exemplary database structure that may be used to perform lookup of billing rates for communications messages 110. The exemplary tables may allow for database lookup of Charge Rate 255 and Measurement Unit 260 based at least in part on Point Code 115 in the manner discussed above, where Point Code 115 is used as an input to determine Service Type/Billing Identifier 210, which in turn is used as an input to Band Label 230. In turn, Band Label 230 is an input into Rate Group ID 245, which helps to determine the Rate ID 250. In turn, a unique Rate ID 250 provides both Charge Rate 255 and Measurement Unit 260.

The tables may be accessed, for example, by billing system 140 and message center 130 in order to determine a billing rate for a specified Point Code 115. In other examples, billing database 145 and message database 135 may be combined into one database, and/or billing system 140 and message center 130 may be combined or separated into one or more systems or devices.

As discussed above, a communications message 110 may include or be associated with at least one of an Origination Point Code, and a Destination Point Code. As both the sender and the receiver of a communications message 110 may potentially be billed for the communications message 110, a billing rate may be determined for both Origination and Destination utilizing one or more queries of the exemplary database. In other examples, a billing rate may be determined for only one physical or network location or for only one Point Code 115.

As illustrated in FIG. 3A, a communications message 110 may include or otherwise be associated with a Point Code 115, and a billing rate may be determined based on that Point Code 115. For example, a communications message 110 may be associated with a Mobile Originate Point Code 115 indicating the physical or network location from which the communications message 110 originated on a communications network 120 (e.g., roaming partner network 150, home network 160, etc.), or indicating the specific origination network device 125 or communications device 105 from which the communications message 110 was sent. A billing rate may be determined based at least in part on the MO Point Code 115.

Point Code Table 305 is an exemplary table, indexed by Point Code 115, and capable of being queried by a Point Code 115 and in many examples a Direction 205 (e.g., MO, MT). Point Code Table 305 may, for example, be included within message database 135. Point Code Table 305 may be queried using a Point Code 115 value, for example included within a communications message 110 (as indicated by a dashed arrow from communications message 110 to Point Code Table 305 in the Figure). With regard to the Direction 205, as illustrated in Point Code Table 305, a Service Type/Billing Identifier 210 may be assigned for a MO communications message 110, and a second Billing Identifier may be assigned for a MT communications message 110. The MO and MT Service Type/Billing Identifiers 210 for a Point Code 115 may be stored as two fields within a same row as indicated in the figure, but in other examples the MO and MT Service Type/Billing Identifiers 210 may be stored in one or more rows in other configurations. Thus, a database table, such as Point Code Table 305, may be queried to retrieve a Service Type/Billing Identifier 210 based on a Point Code 115 and a Direction 205. In this example, the Point Code Table 305 is queried for a MO Service Type/Billing Identifiers 210. The MO Service Type/Billing Identifiers 210 may then be included in a debit request message sent from a message center 130 to a billing system 140, where the request causes the billing system 140 to then determine an appropriate billing rate.

Rating Parameter Table 310 is an exemplary table, indexed by Service Type/Billing Identifier 210, along with COSP ID 215, Merchant ID 220, and Content Type 225, and capable of being queried for a Band Label 230. The Rating Parameter Table 310 may be queried by identifiers including a Service Type/Billing Identifier 210, as well as COSP ID 215, Merchant ID 220, and Content Type 225 identifiers. The Service Type/Billing Identifier 210 used as part of a query may be a Service Type/Billing Identifier 210 value retrieved from Point Code Table 305 (as indicated by a dashed arrow from Point Code Table 305 to Rating Parameter Table 310 in the Figure). Rating Parameter Table 310 may, for example, be included within billing database 145, and may be queried in response to a debit request message sent to the billing system 140. In any event, a Band Label 230 may be determined, as indicated by the dashed arrow from Rating Parameter Table 310 to Band Label 230.

As illustrated in FIG. 3B, Usage Tariff Table 315 is an exemplary table, indexed by Band Label 230, along with additional criteria including for example a calling plan (e.g., Plan ID 240) and a Usage Type 235, and capable of being queried for a Rate Group ID 245. The Band Label 230 field in Usage Tariff Table 315 may be queried using a Band Label 230 value retrieved from Rating Parameter Table 310 (as indicated by a dashed arrow from Band Label 230 to Usage Tariff Table 315 in the Figure), where Rating Parameter Table 310 may be as illustrated in FIG. 3A.

Rate Group ID Table 320 is an exemplary table, indexed by Rate Group ID 245, and capable of being queried for a Rate ID 250. The Rate Group ID 245 field in Rate Group ID Table 320 may be queried using a Rate Group ID 245 value retrieved from Usage Tariff Table 315 (as indicated by a dashed arrow from Usage Tariff Table 315 to Rate Group ID Table 320 in the Figure).

Rate ID Table 325 is an exemplary table, indexed by Rate ID 250, and capable of being queried for a Charge Rate 255 and a Measurement Unit 260 (as indicated by the Rate label in the Figure). The Rate ID 250 field in Rate ID Table 325 may be queried using a Rate ID 250 value retrieved from Rate Group ID Table 320 (as indicated by a dashed arrow from Rate Group ID Table 320 to Rate ID Table in the Figure). The Charge Rate 255 and Measurement Unit 260 may then be returned back to the message center 130 or otherwise used as a billing rate.

Thus, through use of database table such as the exemplary tables discussed in FIGS. 3A and 3B, a Point Code 115 along with other identifiers may be translated into a billing rate including a Charge Rate 255 and a Measurement Unit 260. This Charge Rate 255 and Measurement Unit 260 may be used, for example, to determine a fee amount to debit from a subscriber account for the sending, receiving, or delivery of a communications message 110 (e.g., SMS message), based at least in part on a Point Code 115 (e.g., location of a communications device 105, network device 125, etc.). In the example a billing rate was determined based on a MO Point Code 115 included in a communications message 110, but additionally or alternately a billing rate may similarly be determined based on a MT Point Code 115 included within or otherwise associated with the communications message 110.

Figure 4:
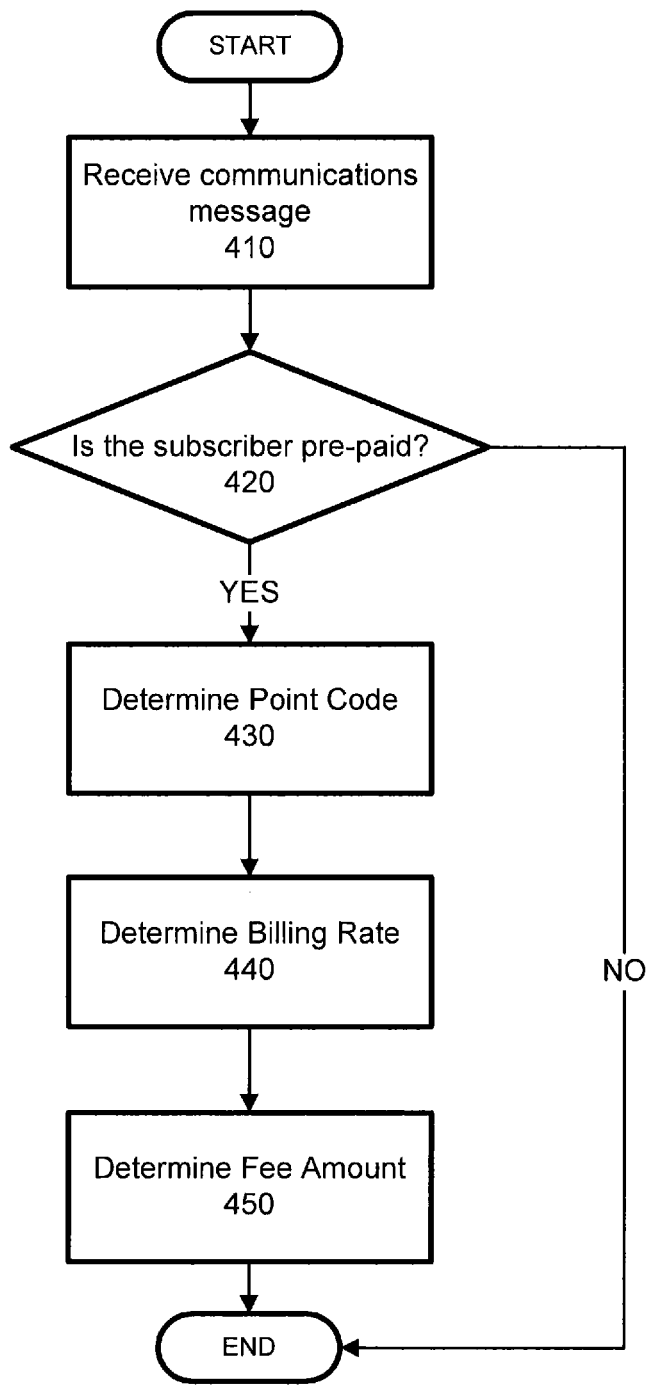
FIG. 4 illustrates an exemplary process for determining a fee amount for a communications message.

FIG. 4 illustrates an exemplary process 400 for determining a fee amount for a communications message 110. For example, the system 100A or 100B may use or incorporate some or all of the steps of process 400 to determine a fee amount to debit for a communications message 110 based on at least one Point Code 115 associated with the communications message 110.

In step 410, a communications message 110 is received. For example, a first subscriber located within a home network 160 may use a communications device 105 to send a MT communications message 110 to the communications device 105 of a second subscriber, where the second subscriber is roaming in a roaming partner network 150. The communications message 110 sent from the first subscriber may be received by a message center 130 for the home network 160 as an intermediary in a process for delivery of the communications message 110.

As another example, a subscriber may use a communications device 105 (such as communications device 105.03 as illustrated in FIG. 1B) to send a MO communications message 110 (e.g., an SMS message) while roaming in a roaming partner network 150.01. The communications message 110 may be associated with Point Code 115.03. The communications message 110 may, for example, be routed through Interconnection Point 165, through Gateway 170, and over links such as STP links, and be received by a message center 130 on a communications network 120 (including, but not limited to a home network 160, a domestic network, the Verizon Wireless network, etc.).

Next, in step 420, it is determined whether a subscriber is pre-paid or post-paid. For example, the message center 130 may perform a lookup of a subscriber directory number to determine whether the subscriber is a pre-paid or post-paid subscriber. If the subscriber is post-paid, then the subscriber may be billed later and the communications message 110 may simply be allowed. However, if the subscriber is pre-paid, then it may be desirable to perform billing at or near the time of the message, such as debiting the pre-paid subscriber account before delivering the communications message 110 in order to ensure payment. If the subscriber is pre-paid, then step 430 is executed next. Otherwise, the process 400 ends.

In step 430, a Point Code 115 may be determined for the communications message 110. The communications message 110 may include at least one Point Code 115, such as an Origination Point Code 115 and a Destination Point Code 115, in which case an included Point Code 115 may be used and no additional determination may be required. In some examples, a Point Code 115 from a network device 125 (e.g., Point Code 115.01 from network device 125.01) may be included in a communications message 110 when the communications message 110 is sent.

Alternately, the communications message 110 may include a directory number from which a Point Code 115 may be determined, such as through Global Title Translation performed by the message center 130 or another network device.

In still other examples, a message center 130 may associate a Point Code 115 with a communications message 110 based on a roaming location of the destination communications device 105, for example obtained by the message center 130 from an HLR for the home network 160.

If no Point Code 115 is associated with the communications message 110, a default Point Code 115 may be supplied by the message center 130. If multiple Point Codes 115 are determined for a communications message, such as an Origination Point Code 115 and a Destination Point Code 115, then steps 440-450 may be repeated for each of the determined Point Codes 115.

Next, in step 440, a billing rate may be determined for the Point Code 115. For example, as discussed above, the Point Code 115 may be used as an input to determine Service Type/Billing Identifier 210, which in turn may be used as an input to Band Label 230. In turn, Band Label 230 is an input into Rate Group ID 245, which helps to determine the Rate ID 250. In turn, a unique Rate ID 250 may be used to provide both Charge Rate 255 and Measurement Unit 260, which may be used as a billing rate.

Next, in step 450, a fee amount may be determined. For example, from the Charge Rate 255 and the Measurement Unit 260 (e.g., as determined in step 440), a fee amount may be calculated. For example if the Charge Rate 255 is '$0.15' and the Measurement Unit 260 is 'per message', then a fee amount of $0.15 may be determined for the sending, receiving, or delivery of a communications message. Additionally, the fee amount may be debited. For example, the message center 130 may send a debit request to the billing system 140 to charge for the message (e.g., '$0.15' per message as determined above in the example for step 480). In other examples, the billing system 140 may directly debit or otherwise cause a debit of a subscriber account associated with the communications message 110 for the fee amount. Then, the process 400 ends.

Conclusion

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   maintaining a repository of location identifiers and billing identifiers, wherein each of a plurality of network devices is associated with a location identifier in the repository, and each location identifier is further associated with at least one billing identifier;
   receiving a communications message;
   determining, by a processing device, a location identifier associated with the communications message and a class of service identifier indicative of whether a subscriber account associated with the communication message is a pre-paid account;
   selectively retrieving, by the processing device, a billing identifier from the repository based at least in part on the location identifier and the class of service identifier, the retrieval including:
      querying the repository for a band label based at least in part on criteria including the location identifier, the class of service identifier, and at least one of a service direction identifier, a merchant identifier, and a content type identifier,
      querying the repository for a rate group identifier based at least in part on the band label and a plan identifier, and
      querying the repository for a rate identifier based at least in part on the rate group identifier; and
   determining, by the processing device, a billing rate based at least in part on the billing identifier.

2. The method of claim 1, wherein each of the location identifiers indicates at least one of a physical location and a network location.

3. The method of claim 1, wherein the at least one billing identifier associated with a location identifier comprises at least one of a mobile originate billing identifier and a mobile terminate billing identifier.

4. The method of claim 1, wherein the billing rate comprises a charge rate and a measurement unit, and further comprising determining a fee amount based at least in part on the charge rate and the measurement unit.

5. The method of claim 1, wherein the location identifiers are Point Codes and the communications message is a short message service message.

6. The method of claim 1, wherein the communications message is of a content type, and where the corresponding billing identifier is selectively retrieved further based on the content type.

7. The method of claim 1, wherein the billing identifier is selectively retrieved from the repository further based on the merchant identifier, the content type identifier, and a usage type identifier.

8. The method of claim 1, wherein the communications message is received from a first communications device selectively connected to a first network device associated with the location identifier, and wherein the communications message is addressed to a second communications device selectively connected to a second network device and associated with a second location identifier.

9. The method of claim 8, further comprising:
   determining the second location identifier associated with the communications message and a second class of service identifier indicative of whether a second subscriber account associated with the communication message is a pre-paid account;
   selectively retrieving a second billing identifier based at least in part on the second location identifier and the second class of service identifier;
   determining a second billing rate based at least in part on the second billing identifier;
   determining a fee amount based at least in part on the billing rate; and
   determining a second fee amount based at least in part on the second billing rate.

10. The method of claim 1, further comprising updating the billing rate corresponding to the communications message by changing the rate identifier associated with the rate group identifier.

11. The method of claim 1, further comprising querying the repository for the billing identifier based at least in part on the rate identifier.

12. A system, comprising:
   a communications network, configured to provide communication services to a plurality of devices;
   a plurality of network devices, wherein the network devices are connected to the communications network, and wherein each network device is associated with a location identifier indicating the network location to which the network device is connected;
   a communications device associated with a subscriber, wherein the communications device is connected to the communications network and configured to send and receive communications messages; and a processing device connected to the communications network and including at least one processor and a computer readable medium having instructions configured to cause the processor to:
  receive a communications message from the communications device;
  determine a location identifier associated with the communications message and a class of service identifier indicative of whether a subscriber account associated with the communication message is a pre-paid account;
  determine a billing identifier based at least in part on the location identifier and the class of service identifier, the determination including to:
    query a repository for a band label based at least in part on criteria including the location identifier, the class of service identifier, and at least one of a service direction identifier, a merchant identifier, and a content type identifier,
    query the repository for a rate group identifier based at least in part on the band label and a plan identifier,
    query the repository for a rate identifier based at least in part on the rate group identifier; and
  determine a fee amount based at least in part on the billing identifier.

13. The system of claim 12, wherein the communications message is a short message service message and wherein the location identifier is a point code.

14. The system of claim 12, further comprising a data storage device connected to the communications network, and configured to maintain a repository of location identifiers and billing identifiers;
  wherein each location identifier in the repository is associated with a network device, and each location identifier is further associated with at least one billing identifier; and
  wherein the processing device further comprises additional instructions to cause the processor to selectively retrieve the billing identifier from the repository based at least in part on the location identifier.

15. The system of claim 14, wherein the at least one billing identifier comprises at least one of a mobile originate billing identifier and a mobile terminate billing identifier.

16. The system of claim 14, wherein each of the at least one billing identifier is associated with a charge rate and a measurement unit; and
  wherein the processing device further comprises additional instructions to cause the processor to determine the fee amount further based at least in part on the charge rate and the measurement unit.

17. The system of claim 14, wherein the communications message is of a content type; and
  wherein the processing device further comprises additional instructions to cause the processor to selectively retrieve a corresponding billing identifier further based on the content type.

18. The system of claim 14, further comprising a billing system connected to the communications network;
  wherein the billing system is configured to maintain a repository of at least one billing identifier and at least one billing rate; and
  wherein the billing system is capable of being queried for billing rate by billing identifier.

19. The system of claim 18, wherein each at least one billing rate comprises a charge rate and a measurement unit.

20. The system of claim 19, wherein the processing device further comprises additional instructions to cause the processor to:
  send the billing identifier to the billing system; and
  receive a fee amount from the billing system.

21. The system of claim 19, wherein the processing device further comprises additional instructions to cause the processor to:
  send the billing identifier to the billing system; and
  receive a charge rate and a measurement unit from the billing system.

22. The system of claim 21, wherein the billing system is further configured to
  receive requests to debit a fee from a subscriber account; and
  wherein the processing device further comprises additional instructions to cause the processor to send a request to the billing system indicating to debit the fee amount from the subscriber associated with the communications device.

23. The system of claim 12, wherein the processing device further comprises additional instructions to cause the processor to query the repository for the billing identifier based at least in part on the rate identifier.

24. A method, comprising:
  maintaining a repository of point codes and billing identifiers, wherein each of a plurality of network devices is associated with a point code in the repository, and each point code is further associated with at least one billing identifier;
  receiving a communications message;
  determining, by a processing device, a point code associated with the communications message and a class of service identifier indicative of whether a subscriber account associated with the communication message is a pre-paid account;
  selectively retrieving, by the processing device, a band label from the repository, the band label mapping combinations of criteria to a billing identifier, the band label being retrieved based at least in part on criteria including the point code, the class of service identifier, and at least one of a service direction identifier, a merchant identifier, and a content type identifier;
  selectively retrieving, by the processing device, a rate group identifier from the repository based at least in part on the band label and a plan identifier;
  selectively retrieving, by the processing device, a rate identifier from the repository based at least in part on the rate group identifier;
  selectively retrieving, by the processing device, the billing identifier from the repository based at least in part on the rate identifier; and
  determining, by the processing device, a billing rate based at least in part on the billing identifier.

25. The method of claim 24, further comprising determining a fee amount based at least in part on the billing identifier.

26. The method of claim 1, wherein the location identifier is a point code.

* * * * *